J. R. GAMMETER.
CORD PACKING.
APPLICATION FILED NOV. 2, 1918.

1,336,030.

Patented Apr. 6, 1920.

Inventor
John R. Gammeter
By Robert M Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

CORD-PACKING.

1,336,030.    Specification of Letters Patent.    Patented Apr. 6, 1920.

Application filed November 2, 1918. Serial No. 260,889.

*To all whom it may concern:*

Be it known that I, JOHN R. GAMMETER, a citizen of the United States, residing at Akron, in the county of Summit and State of Ohio, have invented a certain new and useful Cord-Packing, of which the following is a specification.

This invention relates to an improved pressure-tight guide for cords which pass through the wall of a pressure receptacle such as a balloon envelop. My object is to provide a simplified structure which will effectively pack the cord in either direction of movement of the latter as well as when said cord is stationary in its guide. A further object is to utilize a guide of this class as a means for sustaining the weight of the cord at ordinary times, but enable it to be drawn out of its socket in an emergency, as when the rip-panel of the balloon is pulled open.

Of the accompanying drawings.

Figure 1:
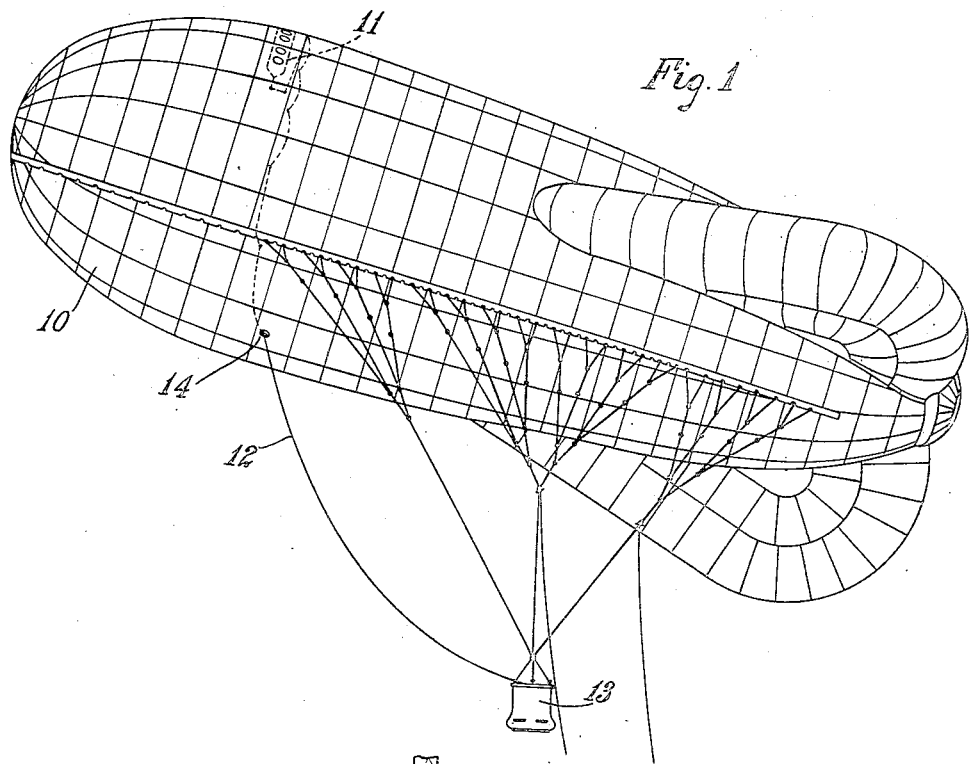
Figure 1 is a side elevation of a kite balloon showing the rip cord and panel.
Figure 2:
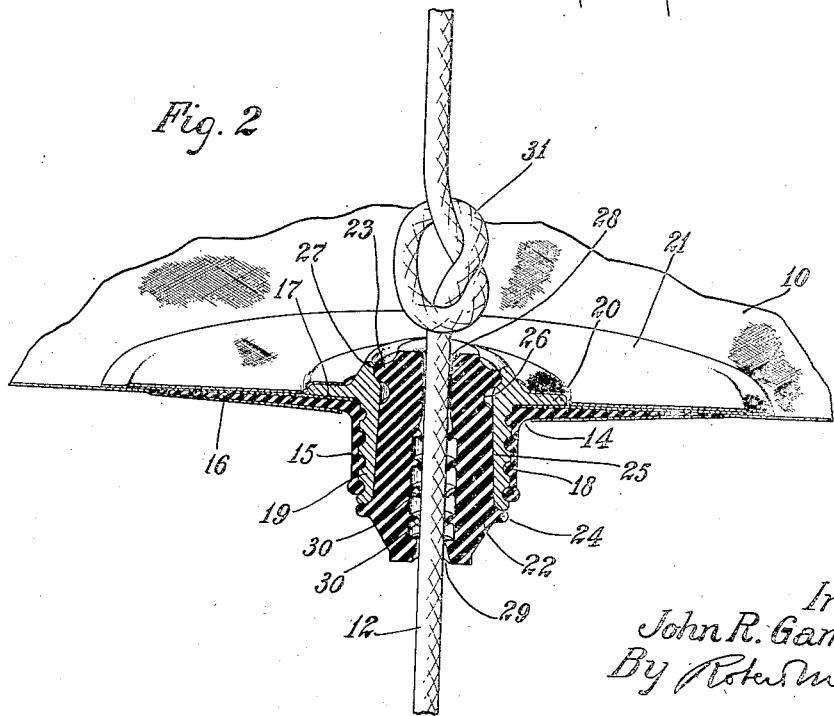
Fig. 2 is a sectional perspective view showing a preferred embodiment of my invention.

The invention may be applied to various of the cords which pass through the balloon envelop, and, in its preferred form here represented, it is especially applicable to the rip-cord.

10 is the balloon body or envelop, 11 is the rip-panel controlling the emergency outlets in the top of said envelop, and 12 is the rip-cord leading in the usual manner from the basket 13 through an aperture 14 in the lower part of the envelop to a point of attachment at one end of said rip-panel. Surrounding said aperture is a soft-rubber sleeve 15 formed with an integral mushroom flange 16 overlying the envelop 10 on the inner side thereof, and overlaid with a reinforcing disk 17 of fabric. This sleeve is formed with internal circumferential ribs 18 occupying grooves in a tubular metal casing or plug-socket 19 which has an upper mushroom flange 20 overlying the inner margin of the fabric disk 17 and partly covered by the inner margin of a second fabric disk 21, the several disks and flanges being cemented together and thus firmly attached to each other and the balloon wall.

22 is a tubular guide plug made of soft vulcanized rubber and formed externally near its upper and lower ends respectively with two circumferential retaining ribs or flanges 23, 24 for engaging suitable seats on the inner and outer ends of the socket, and an intermediate slightly tapered or conical reduced portion 25. Between this tapered portion and the upper rib 23 the plug is circumferentially grooved to form a reduced neck 26, which facilitates the bending of said rib 23 when the plug is forced into the aperture in the socket 19, the deformability and resiliency of said rib permitting it to be crowded through said aperture and then to expand and fill the seat 27 formed to receive it in the inner end of the socket. When the plug is thus forced into place, the rib 24 and coned portion 25 thereof fit tightly against the complemental surfaces of the socket and limit the inward movement of the plug, while the rib 23 resists its outward movement, a pressure-tight external fit of said plug in its socket being thereby secured. Immediately above the plug 22, the cord 12 is tied into a knot 31 which, normally resting upon said plug, sustains the weight of the cord at ordinary times, but causes the plug to be drawn out of its socket and the cord to be relieved of the friction of moving through the plug when the cord is pulled down forcibly to open the rip-panel 11.

The upper and lower end portions 28, 29 of the cord-guiding aperture or channel in the plug 22 are of sufficient size to permit the cord to travel freely, but between these portions the channel is enlarged and interrupted by a series of integrally-molded, annular, centrally-apertured, flexible packing ribs or flanges 30. The normal size of the holes in these flanges is slightly less than the size of the cord 12, and when said cord is not present they stand transversely straightened or substantially at right-angles to the axis of travel of the latter. When the cord is inserted through the plug, it stretches the holes in these flanges and draws the flanges into the form of a series of cones all pointing in the same direction. These cones reverse their direction when the direction of draft upon the cord changes, and their individual and collective effect is such as to maintain at all times a substantially fluid-tight joint about the cord.

The details of shape and construction of the parts may obviously be varied within the scope of the invention,

I claim:

1. The combination of a pressure receptacle, a cord passing through an aperture in the wall of said receptacle, and a pressure-retaining device in said aperture including a plurality of flexible cord-engaging ribs or flanges having apertures normally smaller than the size of the cord and adapted to be stretched to such size by the cord, said flanges, when free, standing substantially at right-angles to the line of travel of the cord and adapted to be drawn by the latter into the form of cones all pointing in the same direction.

2. The combination of a pressure receptacle, a cord passing through an aperture in the wall of said receptacle, and a pressure-retaining device in said aperture including a soft-rubber, flexible, annular, conical, packing member elastically gripping the cord and reversible by a reversal of the direction of travel of the latter.

3. A pressure-retaining cord-guide comprising a tubular soft-rubber member formed internally with a series of integral, annular flanges normally straightened transversely of the cord channel, the end portions of said channel forming guide apertures slightly larger than the apertures in said flanges.

4. The combination of a balloon envelop having an aperture in its lower wall, a cord passing through said aperture and provided with an enlargement immediately above the latter, a plug socket in said aperture, and a soft-rubber guide plug formed internally with a cord-packing flange and removably retained in said socket so as to sustain the weight of the cord by encountering the said enlargement thereon, but adapted to be pulled out of the socket by the cord when the latter is forcibly drawn downwardly.

5. The combination of a balloon envelop having an aperture in its wall, a cord passing through said aperture, a metallic plug socket in said aperture, and a soft-rubber cord-guiding and packing plug removably occupying said socket and formed with a retaining flange on its inner end engaging a seat on the socket, said flange and seat resisting an outward movement of the plug in the socket under normal use, but permitting such outward movement when a strong positive pull is exerted on the plug.

6. The combination of a balloon envelop having an aperture in its wall, a cord passing through said aperture, a metallic plug socket in said aperture formed with plug seats at both ends and an intermediate inwardly-tapered portion, and a soft-rubber cord-guiding and packing plug in said socket having external flanges engaging said seats and an intermediate tapered portion engaging the complemental tapered portion of the socket.

In testimony whereof I have hereunto set my hand this first day of November, 1918.

JOHN R. GAMMETER.